US005400204A

United States Patent [19]

Oshima et al.

[11] Patent Number: 5,400,204

[45] Date of Patent: Mar. 21, 1995

[54] SYSTEM FOR DETECTING A BREAKAGE OF A POWER CABLE FOR AN ELEVATOR SYSTEM

[75] Inventors: Kenji Oshima; Manabu Suganuma, both of Narita, Japan

[73] Assignee: Otis Elevator Company, Farmington, Conn.

[21] Appl. No.: 142,652

[22] Filed: Oct. 25, 1993

Related U.S. Application Data

[63] Continuation of Ser. No. 1,947, Jan. 7, 1993, abandoned, which is a continuation of Ser. No. 486,460, Feb. 28, 1990, abandoned.

[30] Foreign Application Priority Data

Feb. 28, 1989 [JP] Japan .................................... 1-49717

[51] Int. Cl.[6] .............................................. H02H 3/16

[52] U.S. Cl. ........................................ 361/44; 361/48; 361/87; 361/106; 187/277; 187/289; 340/652; 324/527; 324/538

[58] Field of Search ....................... 361/42, 44, 46, 45, 361/48, 86, 87, 91, 106; 340/650-652; 324/523, 527, 538, 543, 544; 187/105, 112

[56] References Cited

U.S. PATENT DOCUMENTS

| | | | |
|---|---|---|---|
| 3,493,815 | 2/1970 | Hurtle | 361/104 |
| 3,764,883 | 10/1973 | Staad et al. | 361/86 |
| 4,371,824 | 2/1983 | Gritter | 361/18 |
| 4,389,694 | 6/1983 | Cornwell, Jr. | 361/48 |
| 4,402,386 | 9/1983 | Ficheux et al. | 187/29 |
| 4,570,753 | 2/1986 | Ohta et al. | 187/1 |
| 4,620,282 | 10/1986 | Shelley | 364/489 |
| 4,683,515 | 7/1987 | Beihoff et al. | 361/106 |
| 5,005,672 | 4/1991 | Nakai et al. | 187/17 |
| 5,009,288 | 4/1991 | Nakai et al. | 187/20 |
| 5,014,826 | 5/1991 | Nakai et al. | 187/112 |
| 5,033,588 | 7/1991 | Nakai et al. | 187/95 |
| 5,074,384 | 12/1991 | Nakai et al. | 187/94 |

OTHER PUBLICATIONS

*Electrical Motor Controls,* Gary Rockis/Glen Mazur, American Tech., pp. 83-86. and 128-138 1982.

Elevator Technology, G. C. Barney, "*A New Elevator Controlled by inverter*", pp. 116-135, 1986.

Elevator Electric Drives, G. C. Barney, "*Monitoring and Protection of AC Motors*", pp. 150-157.

Elevators, F. A. Annett, "*Locating Faults in Direct-current Motors and Controllers*" pp. 251-281, 1989.

Otis Technical Training Focus: Traction Elevator Motion Control, p. 9, no date.

*Primary Examiner*—Todd E. DeBoer

*Attorney, Agent, or Firm*—Joseph P. Abate

[57] ABSTRACT

System For Detecting A Breakage Of A Power Cable For An Elevator System Which can accurately detect the breakage of at least one copper wire in the respective power cables present between the inverter of the elevator system and a linear motor moving element and which is difficult to visually inspect.

15 Claims, 8 Drawing Sheets

*fig.3*
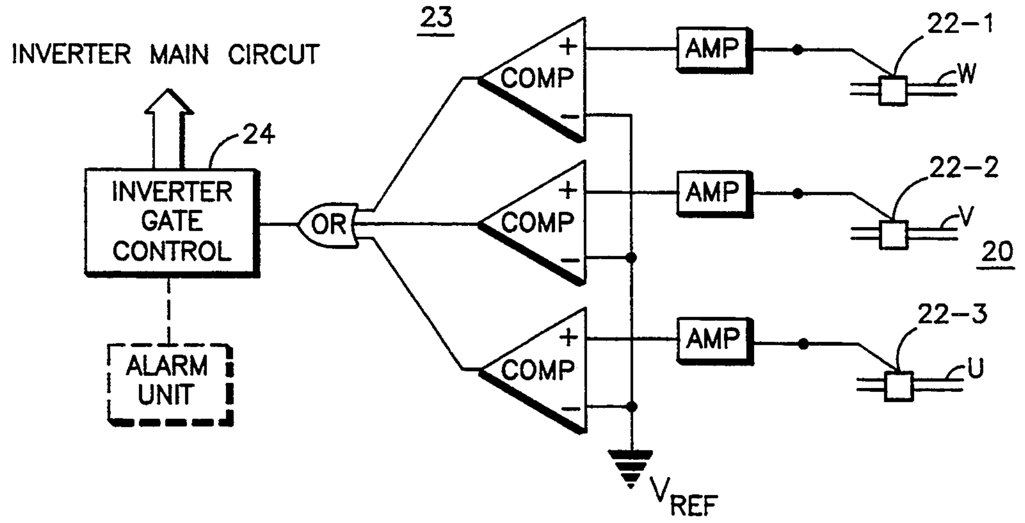
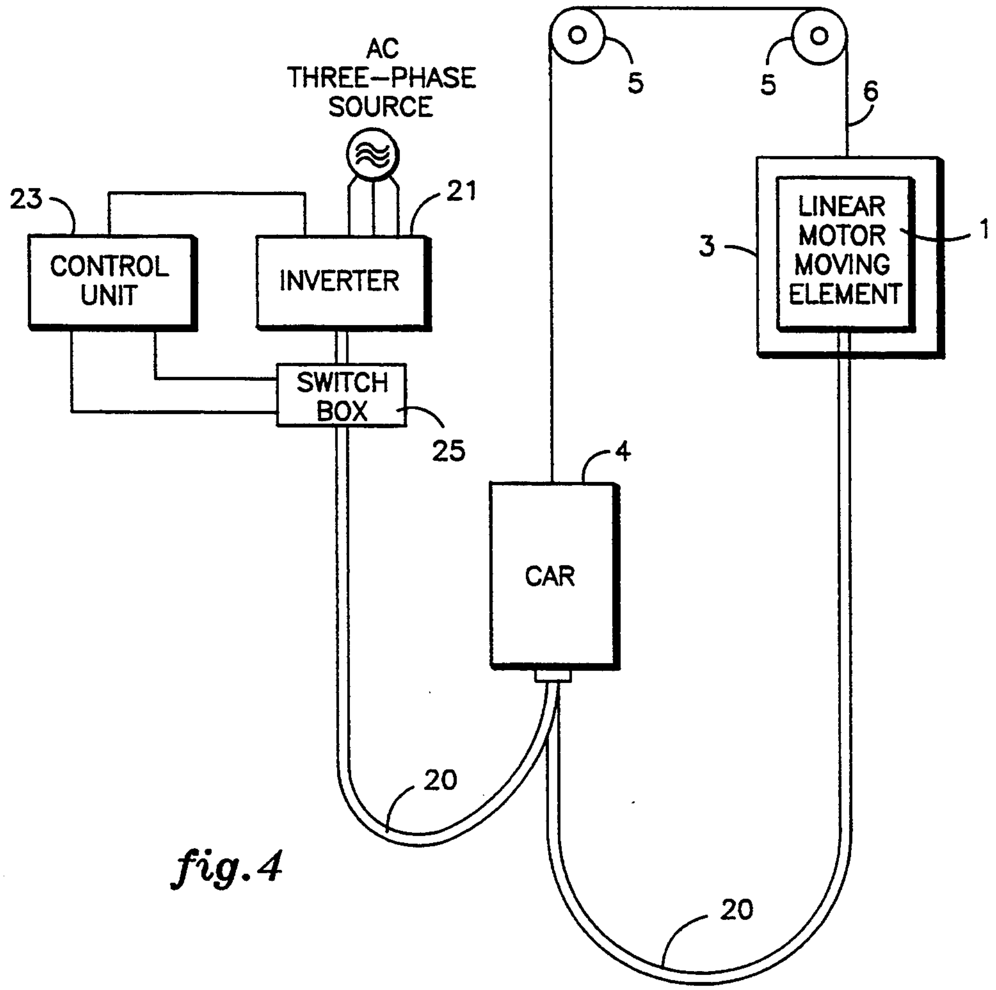
*fig.4*

NFB1

SYSTEM FOR DETECTING A BREAKAGE OF A POWER CABLE FOR AN ELEVATOR SYSTEM

This is a continuation of co-pending application 08/001,947, filed on Jan. 7, 1993, which is a continuation of 07/486,460, filed on Feb. 28, 1990, both now abandoned.

TECHNICAL FIELD

The present invention relates to a system for detecting a breakage of a power cable in elevator, particularly in a linear motor operated elevator

BACKGROUND ART

Traction type elevators are known as elevator drive systems.

In these systems, a machine room is installed above the elevator in which a traction machine is equipped, a car is suspended on one end of a rope, and a counterweight is suspended on the other end of the rope.

However, since the traction machine is relatively large and a brake system of the elevator, control unit and so on are also to be found in the machine room, the machine room requires a large area. In an apartment building, in which a residence space is required to be large as possible, the area occupying the machine room becomes an even greater problem. In addition, the weight of the system in the machine room requires that the structure of the machine room be cost effective, in terms of rigidity.

To solve the above-described problems, an elevator system in which a linear motor is the driving source has been developed. Since the linear motor is a machine whose motor itself makes a linear motion instead of a rotating motion, traction sheaves and so on are not required as they are as in a traction machine and a light-weight elevator system can be achieved. Therefore, since no machine room used for the traction machine installed for the elevator is required, a reduction in size of the whole elevator system becomes possible. In this way, major features in the linear motor driven elevator systems are provided.

Three phase power cables are connected between a linear motor moving element, installed in a counterweight suspended opposite to a car, and an inverter installed in a machine room not above the car. In these cables, a multiple number of copper wires coated with vinyl for each phase are bundled radially in cross section and covered with an insulating material, e.g., polyvinyl chloride. Since the power cables are suspended and spatially moved with the movement of the linear motor (and counterweight) and are used for a long duration of time, such movement could create problems of wear. Copper wires in the individual power cables tend to become bent, folded, and broken and, in worst cases, mutual copper wires are contacted so that a short circuit occurs. Further, if one or more strands of the copper wire is broken in any one of the power cables, current flowing through the other copper wires is increased and a heat is generated in the corresponding power cable. Consequently, the power cable becomes deteriorated and the function of the power cable becomes lost or diminished.

DISCLOSURE OF THE INVENTION

It is, therefore, an object of the present invention to provide a system for detecting a breakage in power cables which monitors an occurrence of a breakage which cannot be visually inspected and in which, in a case where the breakage in the individual power cables occurs, the elevator system is immediately stopped or is not activated.

According to the present invention, a breakage detecting system having at least one power cable extended between an inverter and consisting essentially of a plurality of mutually insulated wires, a means for driving the elevator system, a first means installed on said power cable for determining whether at least one of the plurality of wires constituting said cable is broken, a second means for electrically disconnecting said power cable from said inverter and the driving means effected by the determination of said first means that said wire is broken.

These and other objects of the present invention will become more apparent in light of a detailed description of a best mode embodiment thereof, as illustrated in the accompanying drawings.

BRIEF DESCRIPTION OF THE DRAWING

FIGS. 2 and 3 are sketches of a first preferred embodiment of the breakage detecting system according to the present invention.

FIGS. 4 and 5 are sketches of another preferred embodiment of the breakage detecting system according to the present invention.

BEST MODE FOR CARRY OUT THE INVENTION

Figure 1:
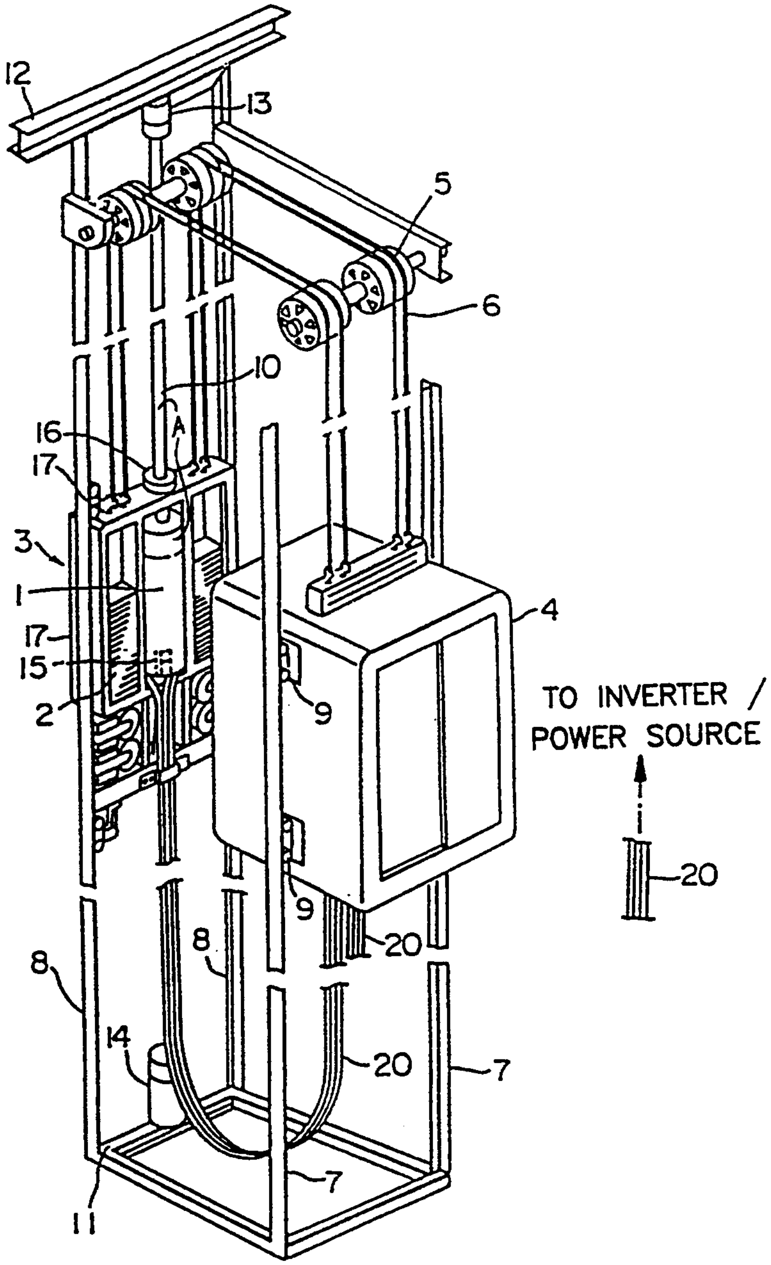
FIG. 1 is an overall view of an elevator system to which a breakage detecting system according to the present invention is applicable.

FIG. 1 shows a plan of a linear motor driven elevator to which the breakage detecting system according to the present invention is applicable.

A cylindrical linear motor A includes a cylindrical moving element 1 and a column 10 wherein said column 10 is a stationary element. The moving element 1 functions as a primary winding and is mounted in a casing constituted by a channel member in which both sides of the moving element are provided with weights. A counterweight 3 is set so that its load is about 1.5 times that of the car 4. The car 4 and counterweight 3 are linked together by means of four ropes 6 and four sheaves 5 installed on an upper portion of the elevator. In addition, each of the ropes is provided with a car guiderail 7 and a counterweight guiderail 8 at both sides thereof.

Each car 4 and counterweight 3 is lifted and lowered via a slide member 9. A column 10 which functions as a secondary winding is made of an aluminum alloy and penetrates the cylindrical moving element 1 at an intermediate portion of the counterweight guiderail 8 between a lower fixed portion, a supporting frame member 11 connected to a lower part of the guiderail 8, and an upper fixed portion, an upper supporting channel 12, via column supporting members 13, 14 The column 10 consists of a plurality of rods each having a length of 1500 mm and a diameter of 100 mm.

The cylindrical linear motor A needs to be provided with a constant gap between the primary and secondary windings. The desired gap is maintained and supported by means of four rollers 15 each located on an upper and lower end of the linear motor A. Gap sensors 16 are attached on upper and lower portions of a casing frame 17 of the counterweight 3 to sense generation of variations of the gap length due to vibrations, impactions, or wearing of the rollers 15. It is noted that although, as shown in FIG. 1, the linear motor is installed on the counterweight 3, it is fully possible to mount the motor in the car itself in order to lift and lower the car.

In addition, in FIG. 1, a power supply terminal (not shown) of the linear motor A is installed on a rear portion of the counterweight 3 in, for example, any known arrangement and the three-phase power supply cables 20 are extended and suspended from a bottom portion of the above-described car 4 from inverter equipment installed on a substantially intermediate floor of the elevator system. The three-phase power cables include: U-phase, V-phase, and W-phase power cables. Each of the three-phase power cables 20 is made of 26 wires (hereinafter referred to as copper wires) in which copper wires, e.g. coated with a black polyvinyl chloride insulating material having a thickness of about 0.8 mm, are bundled together in a radial direction of cross section and its outermost layer is coated with a vinyl sheath. The linear motor moving element 1 installed on the counterweight 3 is driven and controlled by means of the inverter 21 via the power cables 20.

Figure 2:
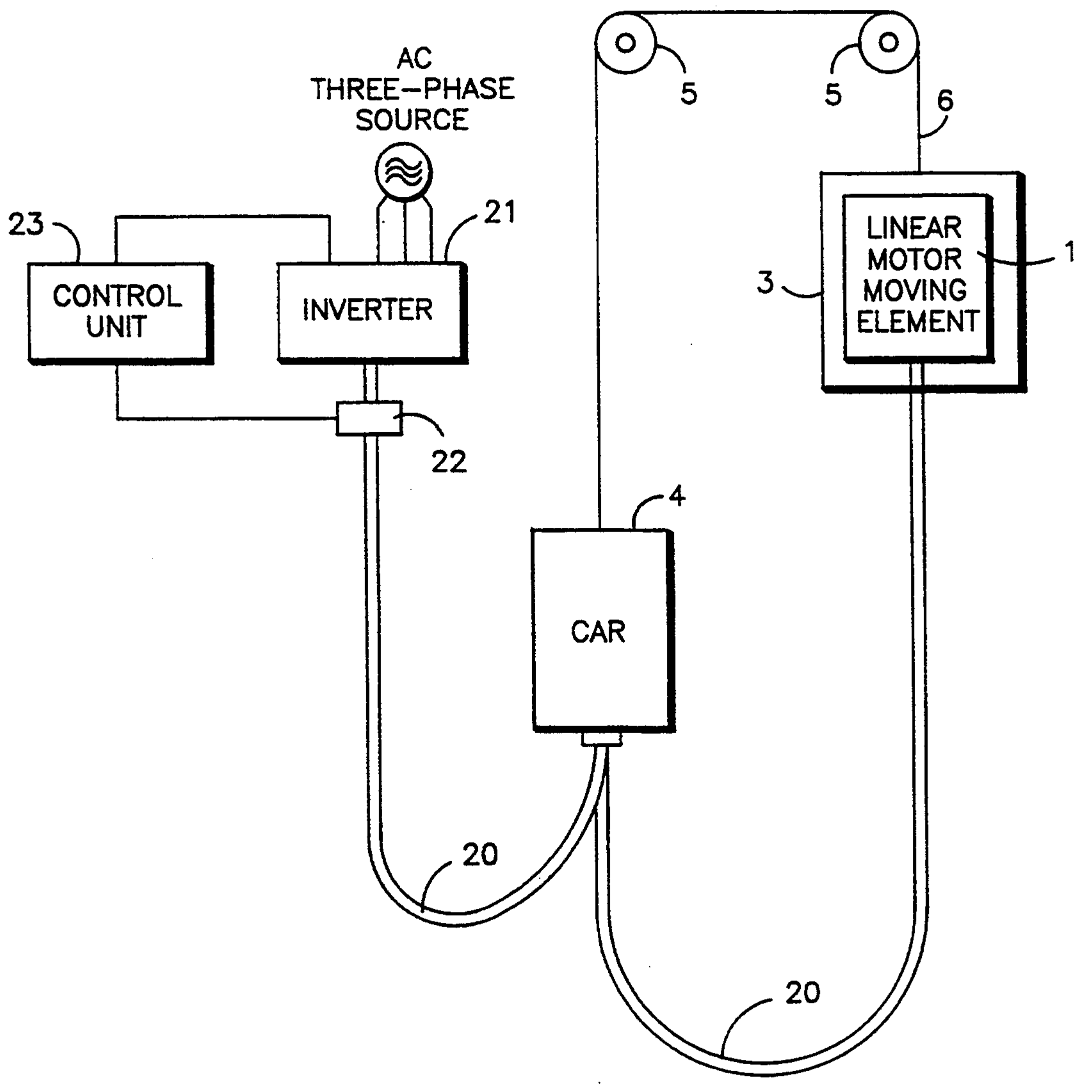

FIG. 2 shows a sketch of a first preferred embodiment of the breakage detecting system according to the present invention.

As shown in FIG. 2, a three-phase commercial power supply is connected to inverter 21. In addition, the power supply cable 20 is extended from the inverter 21 to the linear motor moving element 1 via the car 4. The length of the power supply cable 20 is set so as to balance, in weight, the rope 6. A temperature sensitive sensor 22 is attached onto an arbitrary portion of a surface of the individual power cable 20 and may be done at a point at which the temperature measurement is easy to make. The temperature sensor 22 is mounted on the same corresponding portion for each power supply cable 20. Each temperature sensor 22-1, 22-2, 22-3 may comprise a PTC thermistor having a positive temperature coefficient such that the resistance value is increased as the temperature rises or a NTC thermistor having a negative temperature coefficient such that the resistance value is decreased as temperature increases. In this embodiment, a current passing through the thermistor is so small as to allow disregarding self-heat of the thermistor. Such a thermistor may be used that the resistance versus temperature characteristic of the thermistor has a high temperature coefficient gradient in the vicinity of normal temperature. In this case, the surface temperature of one power cable 20 to be connected between the inverter 21 and linear motor A is measured by an experiment under the similar external environment when one piece of the copper wires is broken and a reference voltage $V_{REF}$ in a comparator COMP to be described later is previously set. Further, in this embodiment, a direct heating type PTC thermistor having the positive temperature coefficient and a rod outer profile is used, which is easy to attach to the surface of each power cable 20. Each temperature sensor 22 (22-1, 22-2, 22-3) is series connected with an amplifier AMP, comparator COMP having first and second inputs (in a case where the NTC thermistor having the negative temperature coefficient is used, the amplifier comprises an inverting amplifier having an operational amplifier), OR circuit OR, and a control unit 23 including an inverter gate control unit 24 and alarm unit ALARM UNIT.

An operation of the preferred embodiment of the breakage detecting system according to the present invention will be described with reference to FIG. 3.

If no breakage occurs in the copper wires constituting the three-phase power cable 20, an output voltage and output frequency of the inverter 21 are normally transmitted to the linear motor moving element 1. In this case, no apparent temperature rise in the power cables 20 is found and a low level output voltage is derived from the comparator COMP. A low level signal is input from the OR circuit OR to the inverter gate control unit 24 and an inverter main circuit normally drives and controls (by variable speed adjustment) the linear motor moving element 1 in accordance with drive commands.

However, if an abnormality occurs in any one of the copper wires constituting the three cables 20, and at least one copper wire is broken, the current passing through the other copper wires is increased. If the current is increased, a heat in the other copper wires is generated and transmitted on the surface of the corresponding power cable 20. The temperature rise is detected by means of one of the temperature sensors 22-1, 22-2, 22-3. Since for example, an inverting input terminal receives the reference voltage $V_{REF}$ corresponding to the temperature of the surface of the corresponding power cable 20 in a case of no temperature rise, the voltage derived from the temperature sensor 22-1, 22-2, or 22-3 is higher than the reference voltage $V_{REF}$ of the comparator COMP due to the temperature rise. The high level signal from the comparator COMP is, thereby, output to the inverter gate control unit 24 via the OR circuit OR.

The inverter gate control unit 24 receives the high level signal from the OR circuit OR and turns off gate signals to the inverter main circuit to stop the power supply to the linear motor moving element 1 (a brake is simultaneously applied to a brake apparatus of the counterweight 3). Consequently, the car 4 in the elevator system is conveniently or immediately stopped. In addition, at that time, the inverter gate control unit 24 transmits an alarm signal to the alarm unit to indicate warning.

Thereafter, an elevator mechanic replaces the broken cable with a new one and reactivates the elevator system.

Although, in the first embodiment, the breakage detection signals on the three-phase power cables 20 are transmitted via the OR circuit OR to the inverter gate control unit 24, each breakage detection signal of the three-phase power cables 20 may independently be supplied to the inverter gate control unit 24. In this case, the inverter gate control unit 24 can easily identify which of the power cable 20 has one of the copper wires broken. In this case, it is preferable to provide a plurality of alarm units according to the number of the power cables 20.

Figure 5:
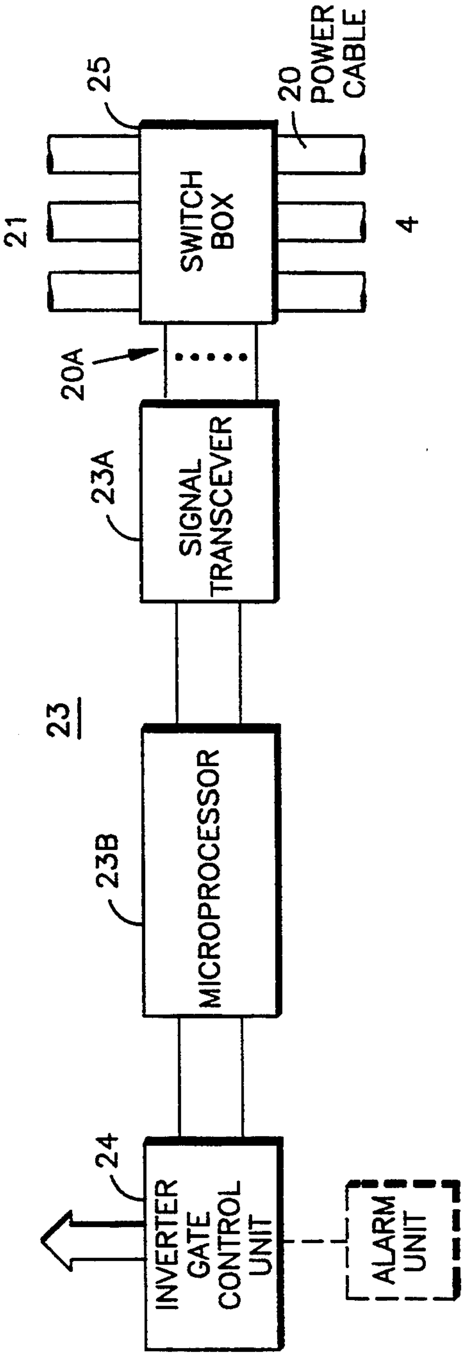

FIGS. 4 and 5 show sketches of a second preferred embodiment in the breakage detecting system according to the present invention.

In the second embodiment, a portion of the power cables 20 adjacent to the inverter 21 is connected to a switch box 25 and signal lines 20A corresponding to the number of copper wires (26) in each power cable 20 are connected to a signal transceiver 23A via the switch box 25.

Switches installed in the switch box 25 are operated to connect each power cable 20 so that the individual copper wires are individually connected to the individual signal lines 20A. The switches cause the connection of first U-phase, then V-phase, and finally W-phase power of cable 20 to the signal lines 20A. As shown in FIG. 5A, the switch box 25, signal transceiver 23A and inverter gate control unit 24 are all under control of a microprocessor 23B which executes a suitable cable test and motor control routine. Of course, the switch box 25 optionally can be operated manually.

Then, when a signal transmit command is issued from a microprocessor 23B to the signal transceiver 23A, a predetermined (constant) voltage signal is transmitted to any one of the signals lines 20A. At this time, if, e.g., no breakage of the copper wires of the U-phase power cable 20 occurs, the above-described voltage signal will be returned from all other copper wires of the corresponding power cable 20 via the linear motor 1. The microprocessor 20B then determines that no breakage occurs in the U-phase power cable and performs inverter gate control via the inverter gate control unit 24. Thereafter, the same processing is carried out until the W-phase power cable 20 has been tested. Finally, the microprocessor 23B determines that no breakage occurred in any of the cables 20 and supplies a normal signal to the inverter gate control unit 24. In this case, the switches in the switch box 25 are changed so as to connect the three-phase power cables 20 to the inverter and the inverter initiates the normal driving.

On the other hand, if at least one of the copper wires in any one of the three-phase power cable 20 has broken, the voltage signal transmitted from the signal transceiver 20A will not be returned from all other copper wires except the signal transmitted wire. Hence, the microprocessor 23B determines that a breakage occurred in the corresponding power cable and supplies a breakage detection signal to the inverter gate control unit 24 and outputs the alarm signal to the alarm unit to indicate the warning.

The above-described second embodiment is useful in the case of an inspection of the elevator system and can detect immediately and accurately the presence or absence of broken copper wire(s) and can identify which of the three-phase power cables has broken copper wire(s).

Figure 6:
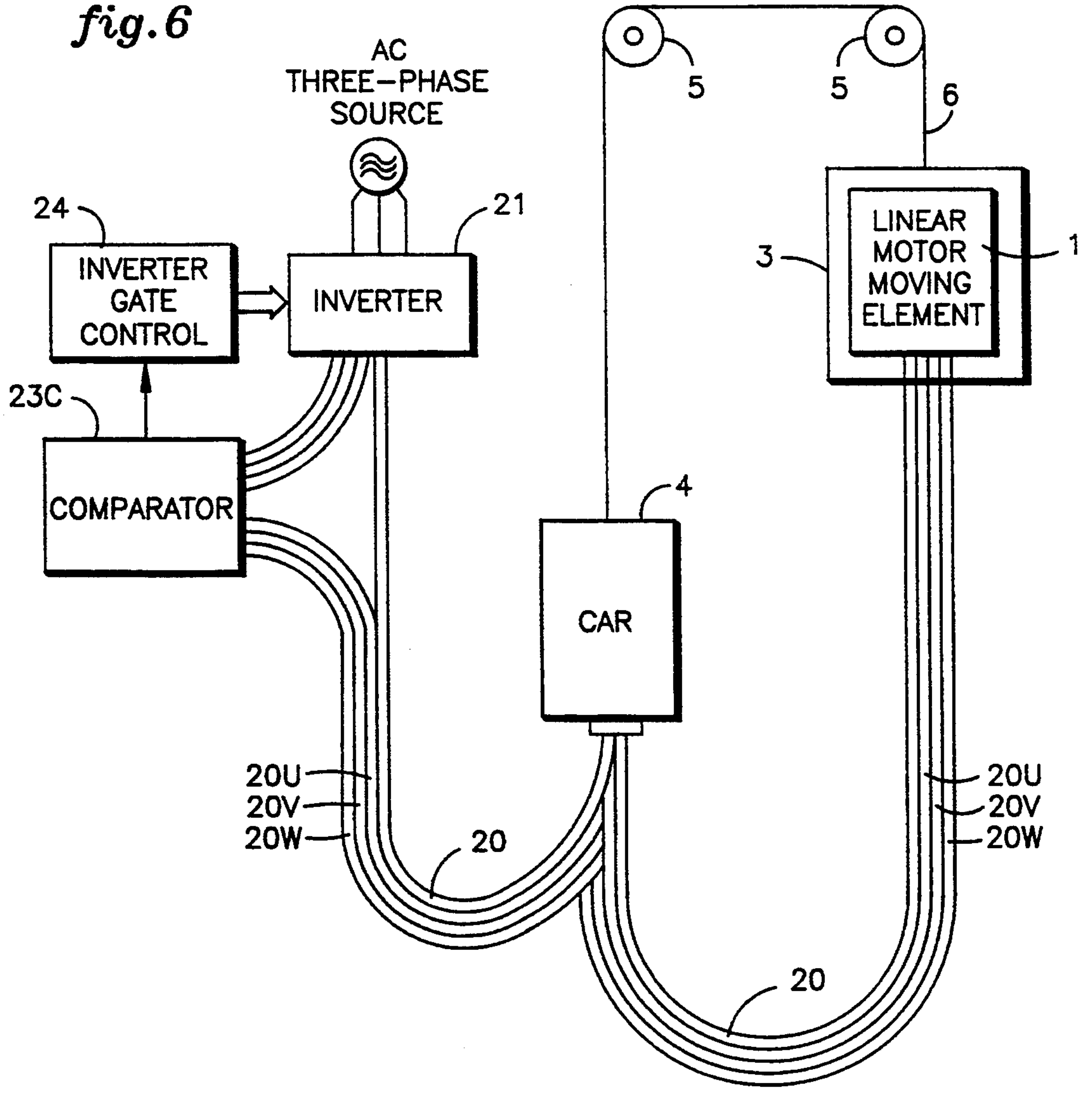
FIGS. 6 and 7 are schematic drawings of the breakage detecting system in a third preferred embodiment according to the present invention.
Figure 7:
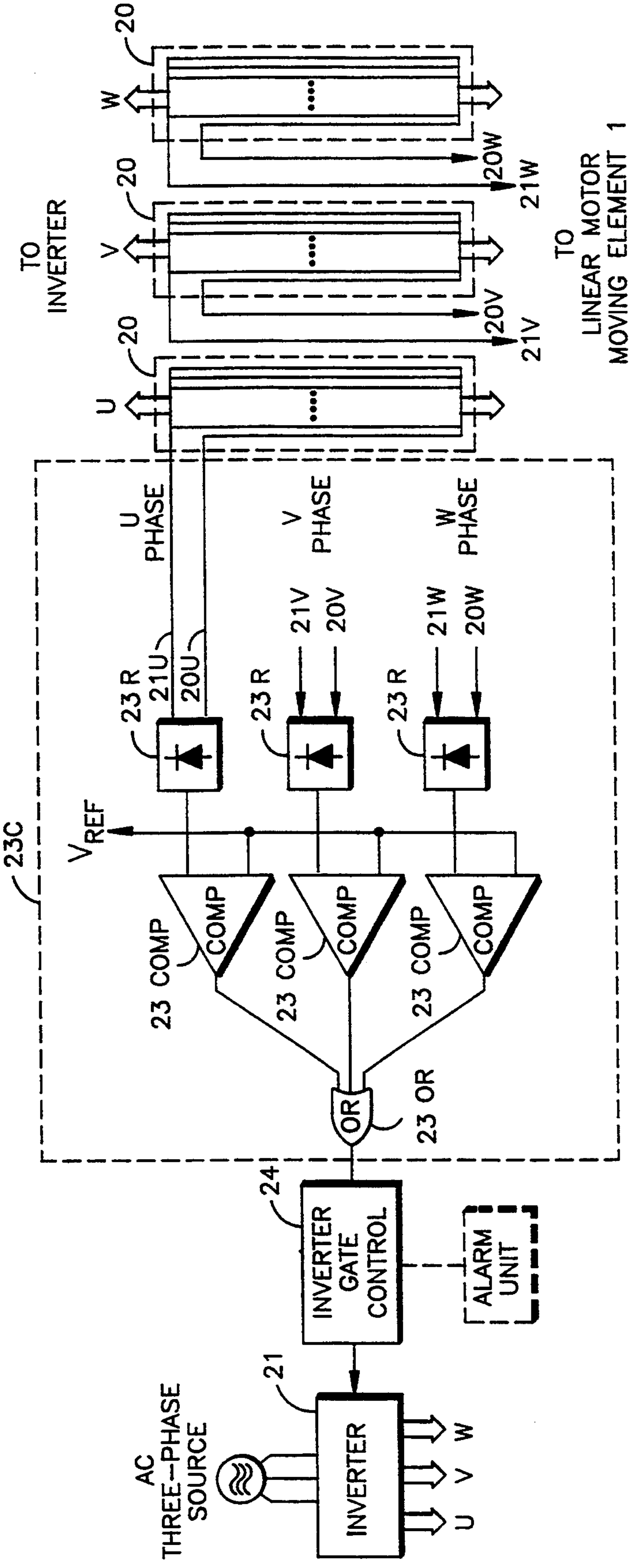

FIGS. 6 and 7 show a third preferred embodiment of the power cable breakage detecting system for an elevator system according to the present invention.

As shown in FIG. 6, in the case of a third preferred embodiment, breakage detecting cables 20U, 20V and 20W are wired in parallel to the power cables 20. These cables extend from each phase of each input terminal of the moving element 1 of the linear motor which is installed on the counterweight 3 and which is connected to the three-phase power cables 20 and a comparator 23C. On the other hand, other breakage detecting cables 21U, 21V, and 21W are wired to the comparator 23C from each output terminal of the inverter 21.

As shown in FIG. 7, the above-described comparator 23C is provided with rectifying bridge circuits 23R, for U-phase, V-phase, and W-phase respectively, for converting for each phase, AC voltage into DC voltage. At this stage, a comparison circuit 23 COMP is installed for comparing a constant reference voltage $V_{REF}$ with the DC voltage supplied from the rectifying bridge circuit 23R for each phase. The reference voltage $V_{REF}$ is set so as to correspond to the voltage drop across each power cable 20 in case a maximum output is provided from the inverter 21 to the linear motor moving element 1 while the power cables have no breakage and are operating normally. As will be described later, the signal indicating the result of the comparison is passed through an OR circuit 23 OR at a stage prior to the control unit 24. The control unit 24 carries out the running control of the linear motor in the elevator system via the inverter 21, as described in the previous preferred embodiments.

The operation of the third preferred embodiment of the breakage detecting system will be described below.

If no breakage in each phase of the power cables 20 occurs, the output voltage and output frequency of the inverter 21 are controlled in response to run commands (including a run start command) issued from the control unit 24 so that the output of the inverter 21 is normally supplied to the linear motor moving element 1 via each phase of the power cables 20. The linear motor moving element 1 is moved along the column 10 as the stationary element of the linear motor according to the output of the inverter 21 while the car 4 is accordingly moved upward and downward. At this time, since no breakage occurred in the power cables 20, the voltage drops between the output terminals of the inverter 21 and input terminals of the linear motor moving element 1 are small as given by the output of the inverter 21. Hence, when the comparators 23 COMP compare the voltages supplied from the rectifying bridge circuits 23R (which convert AC voltages to DC voltages via the breakage detecting cables 20U, 20V, 20W, 21U, 21V, and 21W) with the reference voltage $V_{REF}$, the reference voltage is above each of them, so that a normal signal indicating that the power cables are normal is output from each comparator 23 COMP and supplied to the control unit 24 via the OR circuit 23 OR.

The control unit 24 determines that no breakage occurred in the power cables 20 upon receipt of a "normal" signal and transmits normal run commands to the inverter 21.

However, if any of the copper wires (26 wires) constituting any one phase of the power cables 20 has broken, the resistance of the corresponding power cable 20 is increased and excess current flows through the other copper wires. Therefore, the voltage drop across the corresponding power cable 20 is increased. The increase of the voltage drop is transmitted to the corresponding comparator 23 COMP of the corresponding phase via the rectifying bridge circuit 23R. At this time, it exceeds the reference voltage $V_{REF}$ and an abnormal signal indicating the failure in the corresponding power cable 20 is transmitted to the control unit 24 via the OR circuit 23OR. The control unit 24 is informed that some breakage occurred in the power cable by means of the abnormal signal, and stops the car 4 as soon as possible.

In addition, since the breakage of one copper wire does not affect the running of the linear motor moving element 1, the occurrence of the breakage is provided only when several copper wires of all copper wires (26 wires) in the individual power cables 20 have broken with a maximum output supplied to the moving element 1, and then the voltage drop across the corresponding power cable 20 becomes remarkable so as to influence the running the linear motor moving element 1.

In the third preferred embodiment, in the same way as the first preferred embodiment, the breakage of the power cables can always be monitored and the failed power cable(s) can be replaced with the elevator system stopped in the case of the breakage. In addition, when the OR circuit 23OR is omitted, the control unit may be configured in such a way as to determine which one of the three-phase power cables has broken.

Figure 8:
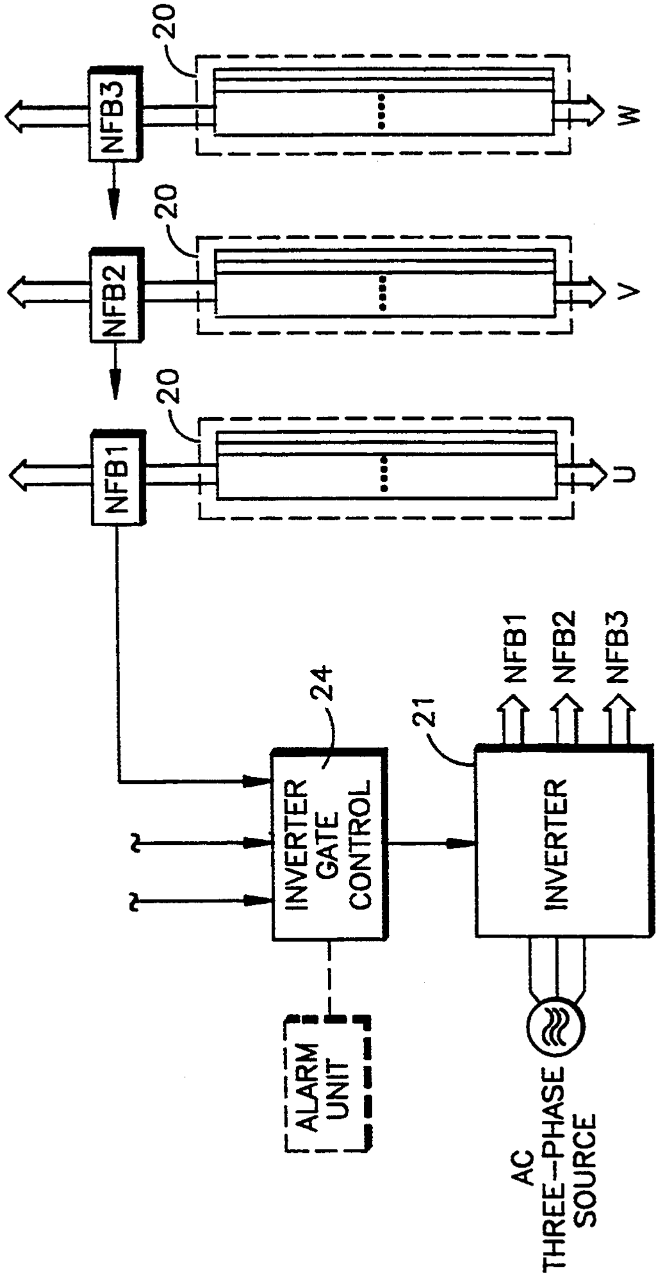
FIGS. 8, 9, and 10 are schematic drawings of the breakage detecting system in a fourth preferred embodiment according to the present invention, FIG. 9 being a sketch of one of the interrupters shown in FIG. 8 and FIG. 10 being a sketch of one of three fuse boxes.
Figure 9:
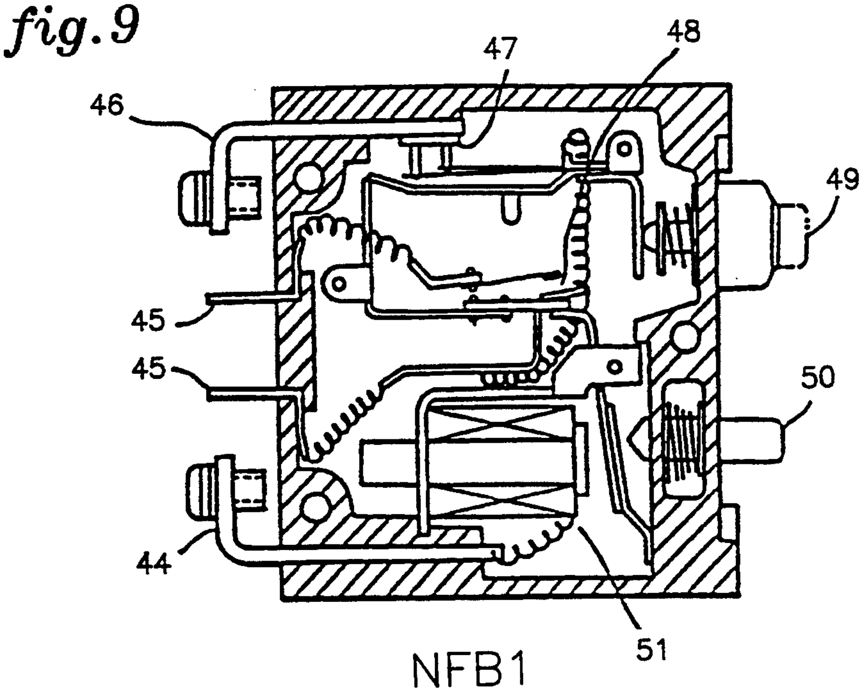
Figure 10:
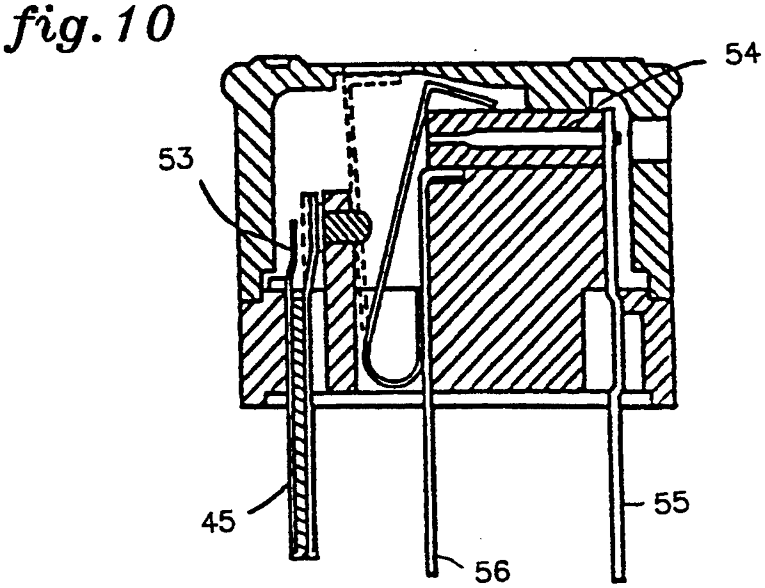

FIGS. 8–10 show a fourth preferred embodiment of the breakage detecting system according to the present invention.

As shown in FIG. 8, wiring interrupters NFB1–NFB3 (Non-fuse Breakers) are disposed between the output terminals of the inverter 21 and corresponding three-phase power cables 20, respectively. Rated current values of the interrupters NFB1–NFB3 are set to values slightly exceeding those at which the maximum output is supplied from the inverter 21 to the moving element 1, the power cables 20 being normal. When the breakage occurs, the current exceeding the rated current flows so that the corresponding interrupter NFB1–NFB3 is disconnected from the inverter 21 and the linear motor moving element 1. At the same time, the alarm signal produced from the corresponding interrupter NFB1–NFB3 is received by the control unit 24 so that the output of the inverter 21 to the three-phase input terminals of the moving element 1 is inhibited. Thereafter, a mechanic may replace the broken cable with a new one and the disconnected interrupter NFB1–NFB3 is reset.

FIG. 9 shows the construction of one of the interrupters NFB1–NFB3 used in the fourth preferred embodiment. It is noted that the other phase interrupters have the same constructions as shown in FIG. 9.

In place of the above-described interrupters NFB1–NFB3, fuse boxes which can output the alarm signals may be used, as shown in FIG. 10.

The preferred embodiments of the breakage detecting system according to the present invention are not limited to the above-described four preferred embodiments.

Although the invention has been shown and described with the respect to a best mode embodiment thereof, it should be understood by those skilled in the art that the foregoing and various other changes, omissions, and additions in the form and detail thereof may be made therein without departing from the spirit and scope of the invention.

We claim:

1. An elevator system having an arrangement for detecting a breakage of a power cable, comprising:
- a car coupled to a driving means for driving said car;
- an inverter;
- at least one power cable consisting essentially of a plurality of wires connected between said inverter and said driving means, the driving means including a cylindrical linear motor electrically connected to said at least one power cable;
- a first means, installed on said power cable at a point which is distanced physically closer to said inverter measured along said power cable than to said driving means, for determining whether at least one of said plurality of wires constituting said cable is broken; and
- a second means for electrically disconnecting said power cable from said inverter to said cylindrical linear motor when said first means determines that said wire is broken.

2. A system as set forth in claim 1, wherein said first means comprises a temperature sensitive sensor mounted on an arbitrary portion of a surface of said power cable.

3. A system as set forth in claim 1, wherein said first means comprises a switch box for switching the connections of said power cable to a means connectable to the individual wires of said cable by means of the switch box, for transmitting a signal to any one of the wires of said power cable and for determining whether the transmitted signal is returned via all of the other wires.

4. A system as set forth in claim 1, wherein said a first means includes first cable disposed in parallel to said power cable from the driving means side of said power cable, a second cable led from the inverter side of the power cable, and comparing means, connected between said first and second cables, for determining whether a voltage drop across the power cable is above a predetermined reference voltage.

5. A system as set forth in claim 4, wherein the reference voltage in the comparing means corresponds to the voltage drop of the power cable when a maximum output from the inverter is supplied to the driving means and when the power cable has no breakage.

6. A system as set forth in claim 1, characterized in that the detecting system comprises three power cables corresponding respectively to a U phase, a V phase, and a W phase, each cable consisting essentially of a plurality of mutually insulated wires.

7. A system as set forth in claim 6, wherein said second means comprises interrupting means, connected between the power cable and inverter, for interrupting the output of the inverter when a current exceeding a rated value flows through one power cable and for transmitting an alarm signal indicating the detection of the breakage in the power cable and the occurrence of the interruption to said second means.

8. A system as set forth in claim 7, characterized in that said interrupting means includes a non-fuse breaker (NFB).

9. A system as set forth in claim 1 wherein said second means comprises an inverter gate control unit.

10. A system as set forth in claim 7, characterized in that said second means further comprises an alarm unit electrically coupled to said inverter gate control unit so that when said second means electrically disconnects said power cable, said second means produces an alarm via said alarm unit.

11. A system as set forth in claim 8, characterized in that said second means further comprises a means for discriminating in which one of said three power cables the breakage of said at least one wire occurs.

12. An elevator system with motor protection, comprising:
- a car;
- a linear motor connected to said car so that said car is movable in response to a movement of said liner motor;
- an inverter;
- a cable electrically connecting said linear motor to said inverter, said cable including a plurality of wires;
- means for detecting a break in any one of said wires, said detecting means including a solid-state temperature sensor mounted on said cable at a point which is distanced physically closer to said inverter measured along said power cable than to said linear motor, a comparator having first and second inputs and an output, said first input being connected to said temperature sensor, said second input being connected to a constant voltage source corresponding to an output voltage of said temperature sensor when none of said plurality of wires is broken; and means for electrically disconnecting said cable from said inverter when said detecting means detects a break in one of said wires, said electrically disconnecting means being electrically coupled to said output of said comparator.

13. A system as claimed in claim 12, wherein said electrically disconnecting means includes an inverter gate control unit having an input electrically coupled to said output of said comparator and also having an output electrically coupled to said inverter.

14. An elevator system with motor protection, comprising:

a car;

a linear motor connected to said car;

an inverter;

a cable electrically connecting said linear motor to said inverter, said cable having a plurality of wires;

means for detecting a break in any one of said wires, said detecting means including a switch box connected to said cable, a signal transceiver, a number of transmission lines connecting said signal transceiver to said switch box, said number of transmission lines being equal to said plurality of wires, a microprocessor, electrically connected to said transceiver and to said switch box, for causing said signal transceiver to transmit a predetermined signal to any one of said wires and to receive signals from said remaining wires, and for causing said microprocessor to output a breakage detection signal if said signal transceiver fails to receive a signal corresponding to said predetermined signal from each of said remaining wires; and means for electrically disconnecting said cable from said inverter in response to said breakage detection signal.

15. A system as claimed in claim 14, wherein said disconnecting means includes a gate control unit having an input connected to said microprocessor and an output connected to said inverter, and wherein said disconnecting means further includes an alarm unit connected to said gate control unit.

* * * * *